US 12,521,515 B2

United States Patent
Saied

(10) Patent No.: US 12,521,515 B2
(45) Date of Patent: Jan. 13, 2026

(54) ADJUSTABLE PEEP VALVES FOR VENTILATORS

(71) Applicant: Abdolreza Saied, Carmichael, CA (US)

(72) Inventor: Abdolreza Saied, Carmichael, CA (US)

(73) Assignee: VORTRAN MEDICAL TECHNOLOGY 1, INC., Sacramento, CA (US)

( * ) Notice: Subject to any disclaimer, the term of this patent is extended or adjusted under 35 U.S.C. 154(b) by 778 days.

(21) Appl. No.: 17/936,325

(22) Filed: Sep. 28, 2022

(65) Prior Publication Data

US 2023/0075412 A1 Mar. 9, 2023

Related U.S. Application Data

(63) Continuation of application No. PCT/US2021/027225, filed on Apr. 14, 2021.

(60) Provisional application No. 63/152,238, filed on Feb. 22, 2021, provisional application No. 63/010,361, filed on Apr. 15, 2020.

(51) Int. Cl.
*A61M 16/20* (2006.01)
*A61M 16/08* (2006.01)

(52) U.S. Cl.
CPC ...... *A61M 16/208* (2013.01); *A61M 16/0866* (2014.02); *A61M 16/205* (2014.02); *A61M 16/206* (2014.02)

(58) Field of Classification Search
CPC .................. A61M 16/20–209; A61M 16/0866
See application file for complete search history.

(56) References Cited

U.S. PATENT DOCUMENTS

| 3,993,059 | A | | 11/1976 | Sjostrand | |
|---|---|---|---|---|---|
| 4,207,884 | A | * | 6/1980 | Isaacson | A61M 16/209 137/493 |
| 4,257,453 | A | * | 3/1981 | Kohnke | A61M 16/209 137/514.3 |
| 6,102,038 | A | | 8/2000 | Devries | |
| 8,534,283 | B2 | * | 9/2013 | Howe, Jr. | A61M 16/1065 128/205.12 |
| 2009/0071478 | A1 | | 3/2009 | Kalfon | |
| 2010/0076332 | A1 | | 3/2010 | Tolmie | |

(Continued)

FOREIGN PATENT DOCUMENTS

| EP | 2153859 | 12/2015 |
|---|---|---|
| WO | 2017059667 A1 | 4/2017 |
| WO | 20210211679 | 10/2021 |

OTHER PUBLICATIONS

ISA/US, United States Patent and Trademark Office (USPTO), International Search Report and Written Opinion issued Jul. 29, 2021, related PCT international application No. PCT/US2021/027225, pp. 1-10, with claims searched, 11-18.

(Continued)

*Primary Examiner* — Valerie L Woodward
(74) *Attorney, Agent, or Firm* — O'BANION & RITCHEY LLP; John P. O'Banion

(57) ABSTRACT

PEEP-valves configured to be placed inline with the exhalation path of a ventilator and ahead of the exhalation valve. The PEEP-valve functions as a resistor that can provide a higher PEEP value for any given PIP, lung compliance, and respiratory rate combination compared to a standard PIP to PEEP ratio.

25 Claims, 13 Drawing Sheets

(56) References Cited

U.S. PATENT DOCUMENTS

| | | | |
|---|---|---|---|
| 2010/0199991 A1* | 8/2010 | Koledin | A61M 16/107 |
| | | | 128/205.12 |
| 2010/0206310 A1* | 8/2010 | Matsubara | A61M 16/209 |
| | | | 128/205.24 |
| 2010/0306992 A1 | 12/2010 | Cooke | |
| 2012/0012111 A1 | 1/2012 | Howe, Jr. | |
| 2013/0184619 A1 | 7/2013 | Von Hollen | |
| 2015/0018694 A1 | 1/2015 | Gomo | |
| 2017/0113012 A1 | 4/2017 | Tatkov | |
| 2017/0246421 A1 | 8/2017 | Ji | |

OTHER PUBLICATIONS

VORTRAN Technical Report VAR-0601, "The VORTRAN Automatic Resuscitator—VAR-Plus is ideal with changing compliance", VORTRAN Medical Technology 1, Jul. 20, 2006, pp. 1-2.
VORTRAN Medical, "'Additional' In-Line PEEP Set-up for PEEP Valve", pp. 1, circa 2006.

* cited by examiner

ADJUSTABLE PEEP VALVES FOR VENTILATORS

CROSS-REFERENCE TO RELATED APPLICATIONS

This application claims priority to, and is a 35 U.S.C. § 111(a) continuation of, PCT international application number PCT/US2021/027225 filed on Apr. 14, 2021, incorporated herein by reference in its entirety, which claims priority to, and the benefit of, U.S. provisional patent application Ser. No. 63/010,361 filed on Apr. 15, 2020, incorporated herein by reference in its entirety, and which also claims priority to, and the benefit of, U.S. provisional patent application Ser. No. 63/152,238 filed on Feb. 22, 2021, incorporated herein by reference in its entirety. Priority is claimed to each of the foregoing applications.

The above-referenced PCT international application was published as PCT International Publication No. WO 2021/211679 A1 on Oct. 21, 2021, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

In mechanical ventilators, the pressure in the airways will be kept positive and the positive pressure at the end of respiratory cycle (end of exhalation) is called Positive End-Expiratory Pressure (PEEP). In most modern ICU ventilators, PEEP is electronically modulated to the desired level.

However, in non-ICU ventilation devices such as portable emergency devices, the PEEP is not controllable. For example, VORTRAN® manufactures an automatic resuscitator under the GO2VENT® brand that provides pressure-limited/flow controlled emergency ventilation. The device will respond automatically to changes in compliance where the Peak Inspiratory Pressure (PIP) can be adjusted to a desired pressure suitable for obtaining the tidal volume. However, the Positive End-Expiratory Pressure (PEEP) is intrinsic to PIP and is not adjustable.

Therefore, there is a need for a way to control PEEP in devices such as GO2VENT® branded and other similar products so that, for example, the PEEP can be adjusted to meet respiratory demands.

BRIEF SUMMARY

To meet the need for achieving a desired Positive End-Expiratory Pressure (PEEP) level in respiratory devices instead of a standard Peak Inspiratory Pressure (PIP) to PEEP ratio, this disclosure describes fixed and adjustable embodiments of a PEEP-valve configured to be placed inline with the exhalation path of a ventilator and ahead of the exhalation valve. The PEEP-valve functions as a resistor that can provide a higher PEEP value for any given PIP, lung compliance, and respiratory rate combination compared to a standard PIP to PEEP ratio.

By way of example, using the aforementioned PEEP-valve, a VORTRAN® GO2VENT® Model 6123 is able to consistently provide higher PEEP values for any given PIP, lung compliance, and respiratory rate combination compared to the devices standard PIP to PEEP ratio of 5:1. The PEEP valve allows PEEP values that encompass the entire range of PEEP as recommended in the NHLBI ARDS Network's PEEP titration protocol for Acute Respiratory Distress Syndrome (ARDS) patients. The efficacy was studied and at no point during the study did the PEEP drop below the ARDS Network's minimum PEEP of 5 cm-$H_2O$, while maintaining the goals of respiratory rates of less than 35 breaths per minute (BPM) and duration of inspiration less than duration of expiration.

In one embodiment, the PEEP-valve has a restrictor orifice with a preset size to create a fixed resistance against exhalation flow. In another embodiment, the PEEP-valve has adjustable restrictor orifices to create variable resistance against exhalation flow. The resistance provided by both versions will increase the PEEP. The adjustable PEEP-valve version has a plurality of settings so that the desired higher PEEP can be selected by rotating an adjustment knob. Therefore, the PEEP level can be adjusted between lower and higher levels (and vice versa) by opening and closing restrictor orifices instead of having to replace the unit with PEEP valve having a different orifice size.

Both versions of the device are also referred to in this disclosure as a PEEP-Elevated-Resistor-Valve (PERV) or simply a PEEP-valve. Both versions of PEEP-valves are also suitable for use with a mechanical ventilator such as the GO2VENT® brand gas powered ventilator available from VORTRAN®, or other similar mechanical ventilators.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

Figure 14:
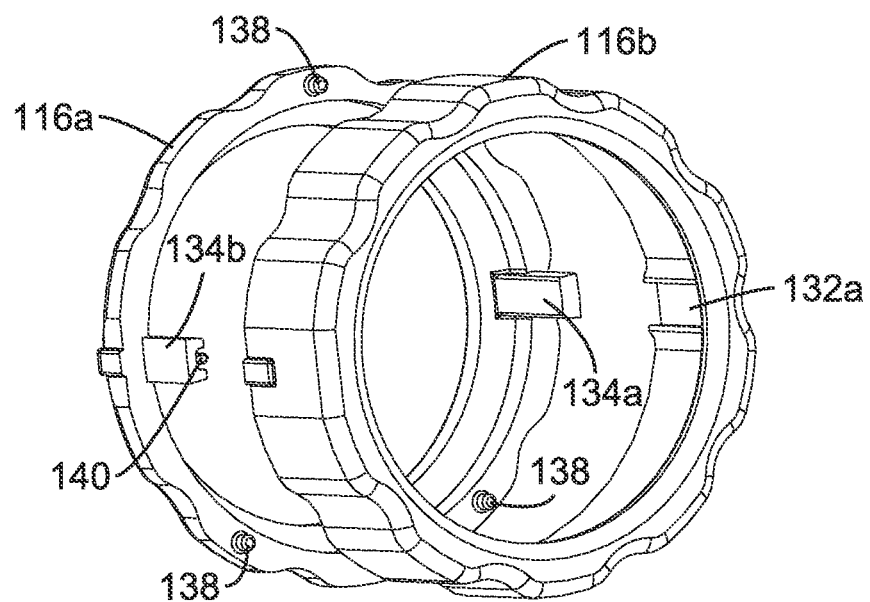
Figure 15:
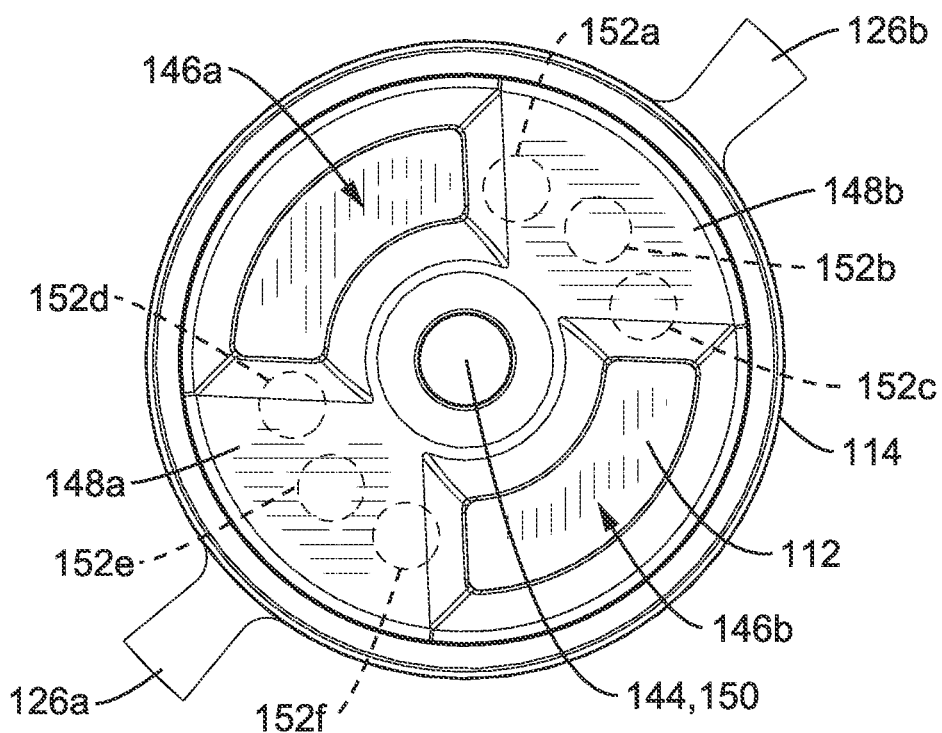

FIG. 14 is a rear perspective exploded view of the adjustment knob portion of the aforementioned adjustable PEEP-valve FIG. 15 through FIG. 18 are a series of schematic diagrams illustrating rotation of the rotatable disk (gate) in relation to the fixed disk (gate) from a closed position (FIG. 15) to a first partially-open position (FIG. 16) to a second partially-open position (FIG. 17), and to a fully open position (FIG. 18), for the aforementioned adjustable PEEP-valve.

Figure 19:
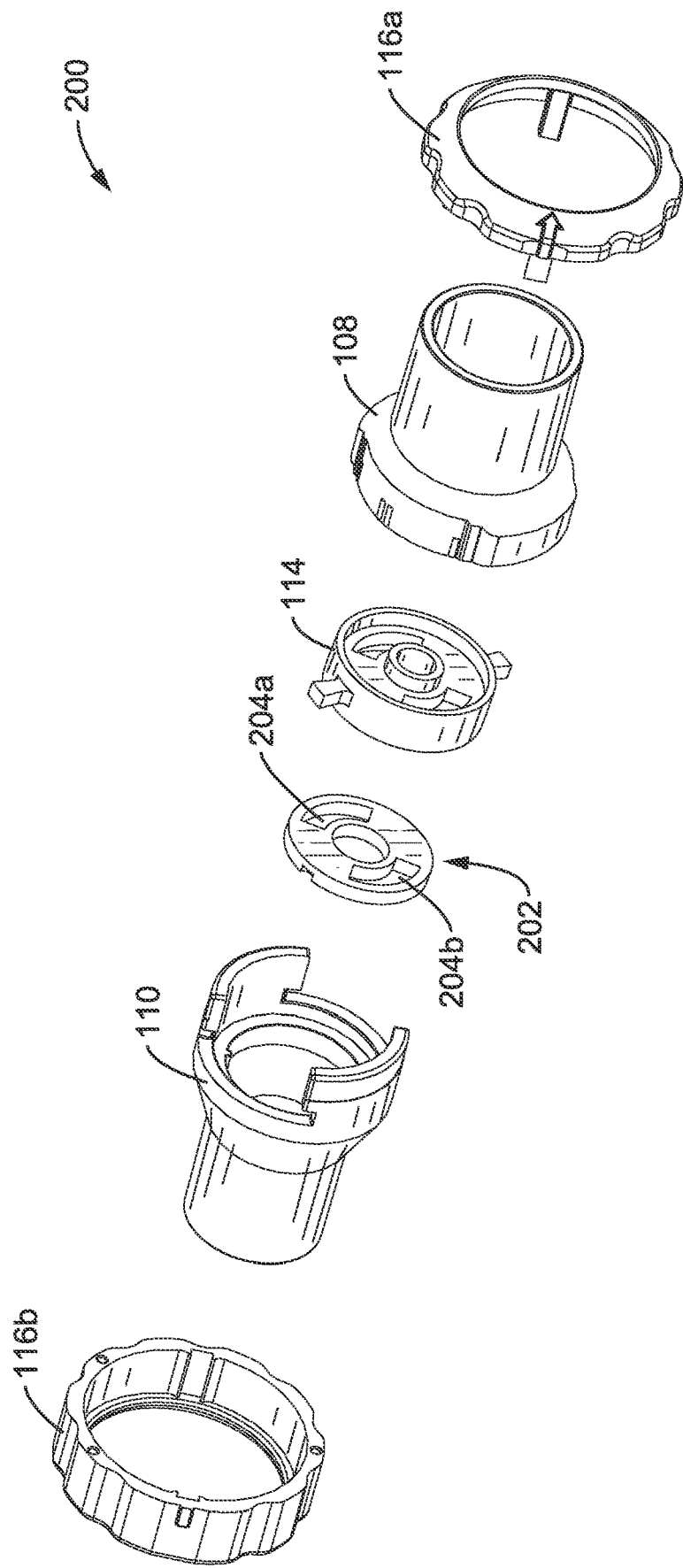

FIG. 19 is an exploded view of a second embodiment of an adjustable PEEP-valve according to the presented technology.

Figure 20:
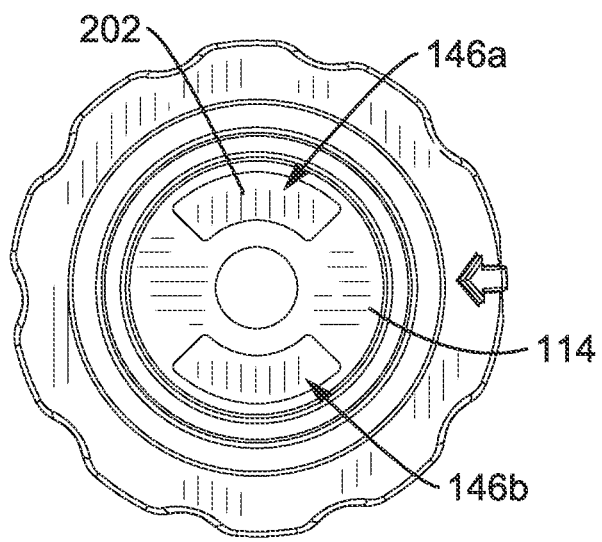
Figure 21:
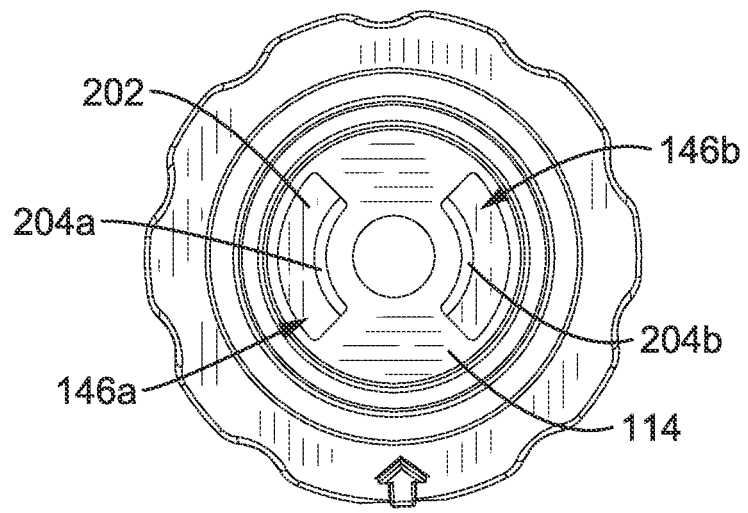

FIG. 20 and FIG. 21 are schematic diagrams illustrating rotation of the rotatable disk (gate) in relation to the fixed disk (gate) from a closed position (FIG. 20) to a fully open position (FIG. 21) for the adjustable PEEP-valve shown in FIG. 19.

DETAILED DESCRIPTION

A. Fixed PEEP Valve

Figure 1:
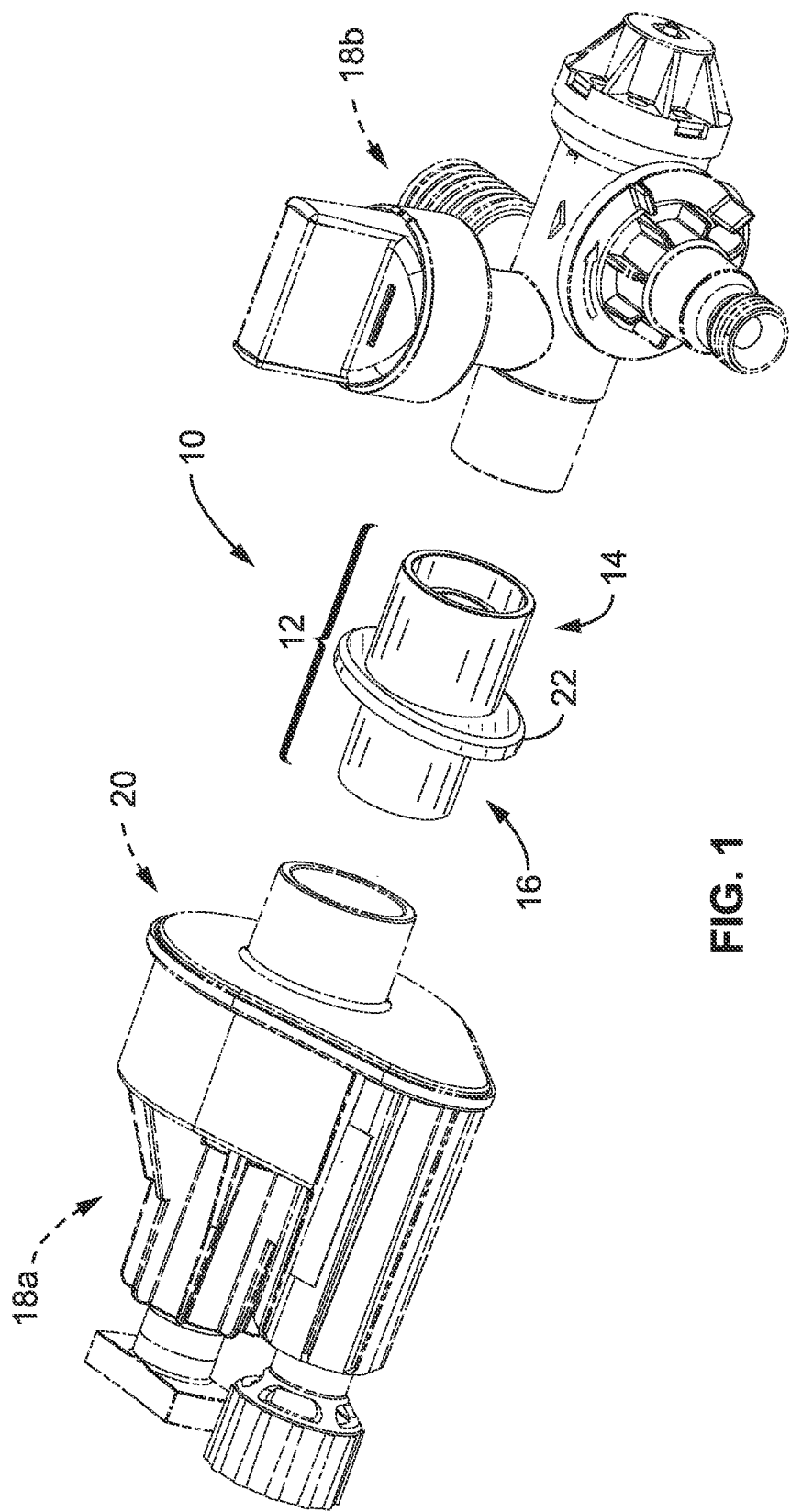
FIG. 1 is a perspective view of a fixed PEEP-valve according to an embodiment of the presented technology, with the PEEP-valve shown in context of use before insertion inline with a ventilator depicted in phantom lines.
Figure 2:
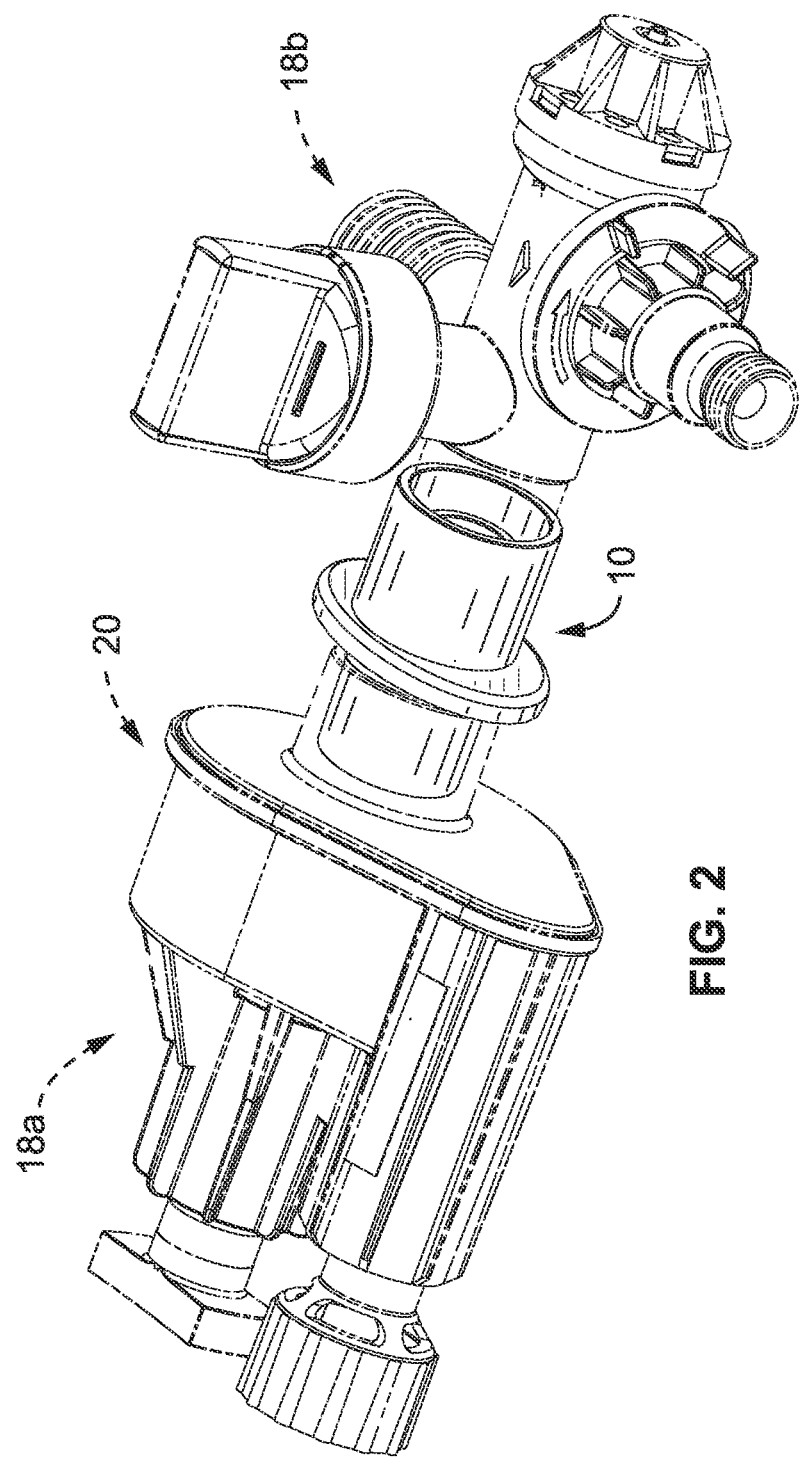
FIG. 2 is a perspective view of the aforementioned fixed PEEP-valve after insertion inline with the ventilator.
Figure 3:
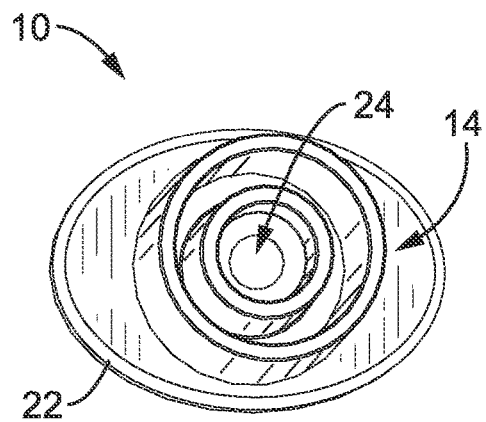
FIG. 3 is a front perspective view (inlet end) of the aforementioned fixed PEEP-valve.
Figure 4:
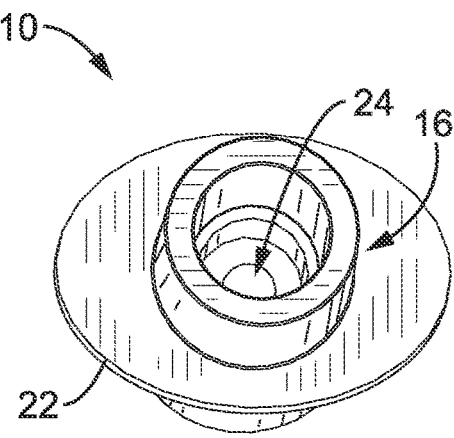
FIG. 4 is a rear perspective view (outlet end) of the aforementioned fixed PEEP-valve.

FIG. 1 illustrates an embodiment of a fixed (non-adjustable) PEEP-valve apparatus 10 according to the present disclosure. In the embodiment shown, the apparatus comprises a valve body 12 with an inlet port 14 and an outlet port 16. Referring also to FIG. 2, the apparatus is configured to be connected in the exhalation path of a ventilator 18a, 18b ahead of (upstream) the exhalation valve 20. An optional flange 22 is provided as a stop when inserting the device and for ease of removal. The ventilator depicted in FIG. 1 and FIG. 2 is a VORTRAN® GO2VENT® model 6123 ventilator. It will be appreciated, however, that the PEEP-valve as described herein can be used with other ventilator makes and models.

In one embodiment, the PEEP is elevated by placing the PEEP-valve in the exhalation pathway before the exhalation valve. As the exhalation valve opens to allow expiration to take place, the PEEP-valve will restrict the exhalation flow. In this regard, note that the PEEP-valve will have no affect on, or only minimally change, the aspiration parameters, but will change expiration and breaths per minute (BPM) and increase the PEEP. In effect, the PEEP-valve will "choke" the exhalation pathway to the level that the patient's lung stays inflated and oxygenated. With the PEEP-valve inline during the exhalation, the PEEP will increase. In other words, the patient's lungs will stay inflated with the required higher positive pressure, the BPM rate will be faster, and the tidal volume (TV) in a sense will be lower. However, because the PEEP has increased, a lower TV is justifiable. A desirable ventilation case for a patient with "stiff lung" as in the case of Acute Respiratory Distress Syndrome (ARDS) will be achievable with the addition of the PEEP-valve to the ventilator.

Figure 5:
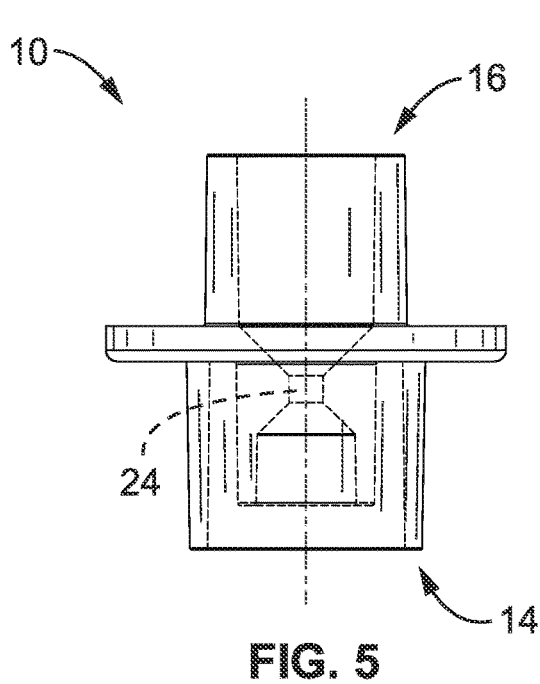
FIG. 5 is a side view of the aforementioned fixed PEEP-valve with hidden lines showing the interior configuration of the inlet and outlet ports and orifice between the ports.

Referring also to FIG. 3 through FIG. 7, the PEEP-valve includes an orifice 24 extending through the apparatus between the inlet and outlet ports. The centerline shown in FIG. 5 illustrates that the inlet port, orifice and outlet port are coaxially aligned. The orifice 24, which is in the exhalation path of the ventilator, restricts the exhalation flow and increases the PEEP. The diameter of the orifice may be variously sized to suit patient groups of different body size and TV. For example, the orifice size may range from about 0.040 to about 0.200 inches in diameter. In one embodiment, the orifice size is about 0.149 inches in diameter which results in desirable PEEP values as a percentage of the Peak Inspiratory Pressure (PIP) setting of the ventilator.

Note that variations in orifice size (smaller and/or larger) will have different affects on the PEEP. For example, an unmodified VORTRAN® GO2VENT® Model 6123 ventilator can generate a PIP to PEEP ratio of about 20%. Therefore, if the PIP is set to 30 cm-$H_2O$, the patient will receive 6 cm of PEEP (30 cm×20%). Increasing the PIP will in turn increase the PEEP. However, with ARDS patients (e.g., patients inflicted with the COVID-19 virus), for example, a higher PEEP is required without risking a dangerously high PIP. Higher PEEP values for a give PIP can be achieved using an inline PEEP-valve such as described herein. The orifices in the PEEP-valve can be sized to, for example, change the ratio of PIP to PEEP to 30%, 40%, etc. Then, instead of 30 over 6 or 20%, we can have 30 over 9 or even 30 over 12 at ratio of 30% or 40% using a PEEP-valve according to the present disclosure.

In one embodiment, the PEEP-valve may be configured as an inline adapter that connects to both 22 mm and 15 mm ports of a VORTRAN® GO2VENT® Model 6123 or similar pressure ventilator/resuscitator.

In various embodiments, the PEEP-valve may be configured as a male-male, male-female, or female-female adapter with ports sized for use with various ventilator devices.

In various embodiments, the PEEP-valve may be configured as an adaptor of a fixed orifice size for a particular patient group. A kit of PEEP-valves with different orifice sizes can be provided so that a desired size can be selected from the kit based on patient group or other PEEP-related criteria.

Example 1

Figure 6:
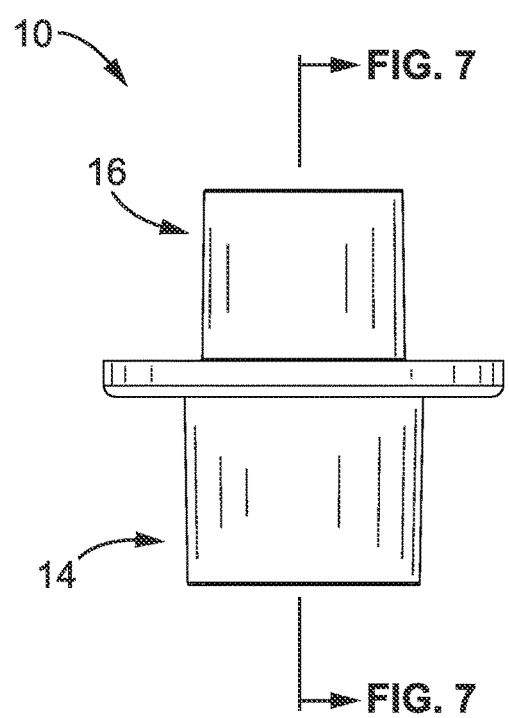
FIG. 6 is a side view of the aforementioned fixed PEEP-valve.
Figure 7:
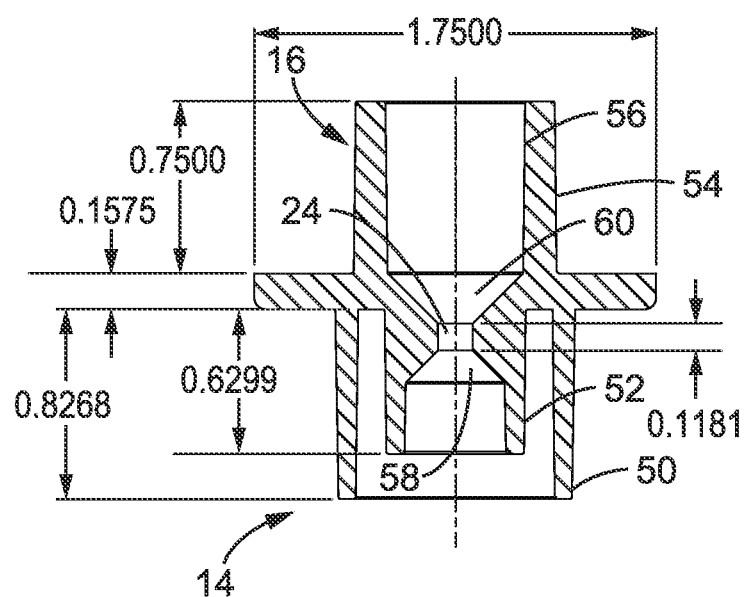
FIG. 7 is a cross section view of the aforementioned fixed PEEP-valve taken through lines 7-7 of FIG. 6.

FIG. 7 is a cross-section of the apparatus taken through lines 7-7 of FIG. 6 and illustrates a non-limiting example of a PEEP-valve with dimensions suitable for use with a VORTRAN® GO2VENT® Model 6123 ventilator. In the example shown, the inlet port 14 comprises a female outer connector 50 with a 22 mm inner diameter and a male inner connector 52 with a 15 mm outer diameter. The outlet port 16 comprises a male connector 54 with a 22 mm outer diameter and a female connector 56 with a 15 mm inner diameter. In the embodiment shown, the interior portion 58 of the inlet port 14 that extends to the orifice 24 has a frustoconical shape as does the interior portion 60 of the outlet port 16 that extends to the orifice. The centerline shown in FIG. 7 illustrates that the inlet port, orifice and outlet port are coaxially aligned. FIG. 7 also shows non-limiting dimensions for an embodiment of the PEEP-valve.

Example 2

A Training & Test Lung Simulator (TTL Model 3600i, manufactured by Michigan Instruments) with PneuView Test Lung Simulation Software was used in the benchtop evaluation of the VORTRAN® GO2VENT® Model 6123 ventilator. The above-described PEEP-valve was placed within the exhalation pathway of the Model 6123 in order to elevate PEEP without increasing PIP. At a set lung compliance, the PEEP and resulting tidal volume (TV) were measured across a typical range of PIP values (20, 25, 30, and 35 cm-$H_2O$) for respiratory rates (RR) of 10, 15, 20, 25, and 30 breaths-per-minute (BPM). This process was repeated for lung compliances of 0.01, 0.02, 0.03, 0.04, and 0.05 L/cm-$H_2O$. For all tests, the I:E ratio was kept at 1:2±20% as per ISO guidelines for gas-powered emergency resuscitators.

The PEEP-valve was shown to substantially increase the given PEEP value for any given PIP, respiratory rate, and lung compliance compared to the use of the Model 6123 without the PEEP-valve. For patients with extremely stiff lungs that had a compliance of 0.01 L/cm-$H_2O$, the PEEP ranged from a low of 6 cm-$H_2O$ at a PIP of 20 cm-$H_2O$ and respiratory rate of 10 BPM, to a high PEEP of 17 cm-$H_2O$ at a PIP of 35 cm-$H_2O$ and respiratory rate of 30 BPM. Tidal volumes for a lung compliance of 0.01 L/cm-$H_2O$ ranged from 103 mL to 243 mL, which was dependent on the set PIP and respiratory rate as expected. Results for a lung compliance of 0.01 L/cm-$H_2O$ are presented in Table 1.

The PEEP-valve's ability to increase the PEEP for a given PIP value was more pronounced as lung compliance was increased, while still providing the high tidal volumes that are necessitated by higher lung compliance. This is indicated by values that were measured for a lung compliance of 0.05 cm-$H_2O$, where the PEEP ranged from a low of 11 cm-$H_2O$ at a PIP of 20 cm-$H_2O$ and respiratory rate of 10 BPM, to a high PEEP of 30 cm-$H_2O$ at a PIP of 35 cm-$H_2O$ and respiratory rate of 30 BPM. Tidal volumes for a lung compliance of 0.05 L/cm-$H_2O$ ranged from 153 mL to 699 mL. Results for a lung compliance of 0.05 L/cm-$H_2O$ are presented in Table 2.

The PEEP was also shown to elevate at any given PIP by increasing the respiratory rate. Increasing the respiratory rate from 10 BPM to 30 BPM at a constant PIP resulted in an average PEEP increase of 7.6 cm-$H_2O$.

The results showed a linear relationship between PIP and PEEP for various respiratory rates at a compliance of 0.01 L/cm-$H_2O$. PEEP was found to increase at a higher rate when increasing PIP at higher respiratory rates, with a lower rate of increase when increasing PIP at lower respiratory rates. We found the same linear relationship between PIP and PEEP at a compliance of 0.05 cm-$H_2O$ However, the rate of increase of PEEP when increasing PIP was found to be near constant across various respiratory rates.

The described PEEP-valve placed inline with the Model 6123 was able to consistently provide higher PEEP values for any given PIP, lung compliance, and respiratory rate combination compared to the Model 6123's standard PIP to PEEP ratio of 5:1. The PEEP-valve allows PEEP values that encompass the entire range of PEEP as recommended in the NHLBI ARDS Network's PEEP titration protocol for ARDS patients; at no point during this study did the PEEP drop below the ARDS Network's minimum PEEP of 5 cm-$H_2O$, while maintaining the goals of respiratory rates of less than 35 BPM and duration of inspiration less than duration of expiration.

B. Adjustable PEEP Valve

Figure 8:
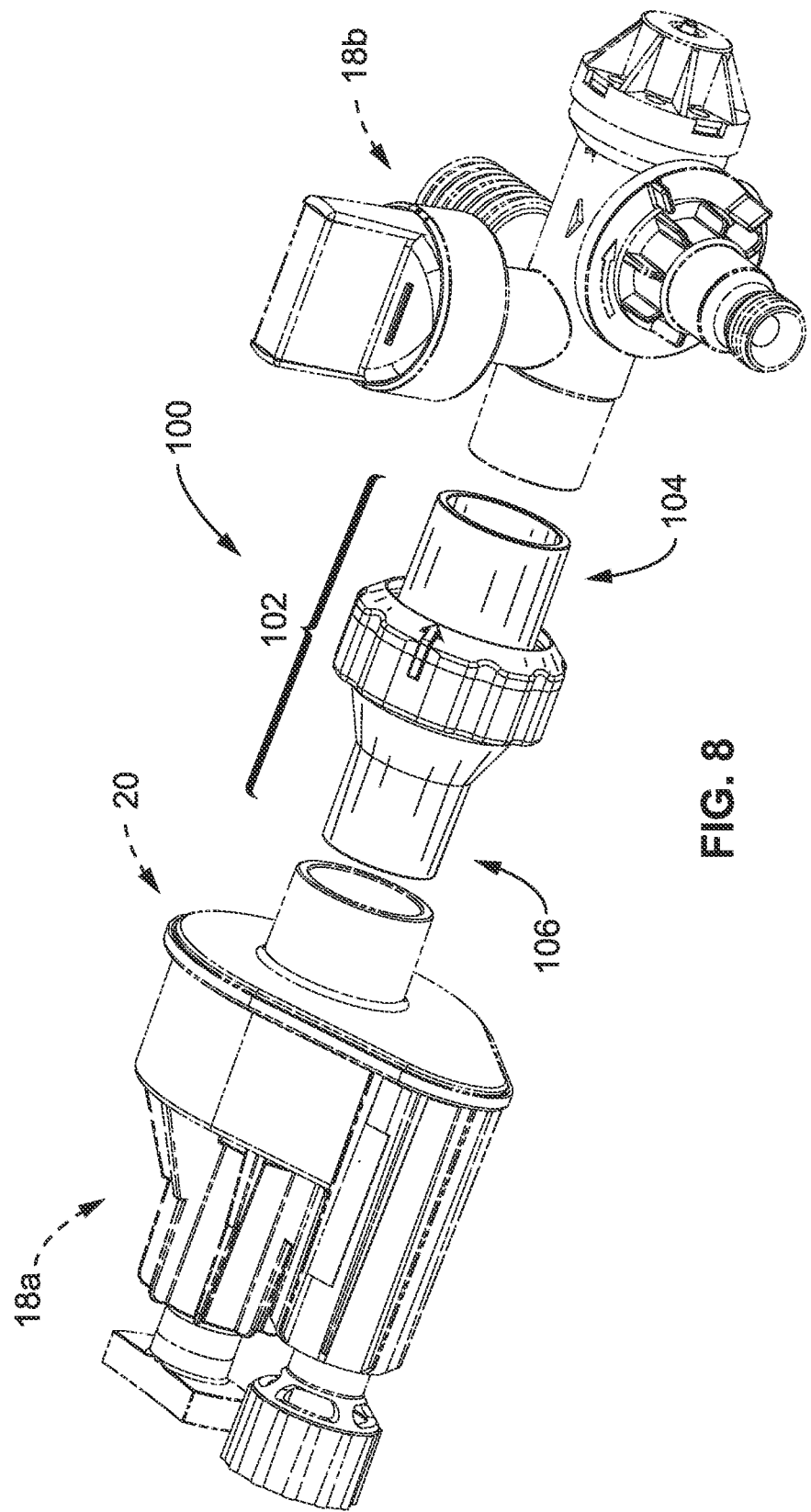
FIG. 8 is a perspective view of an adjustable PEEP-valve according to an embodiment of the presented technology, with the PEEP-valve shown in context of use before insertion inline with a ventilator depicted in phantom lines.
Figure 9:
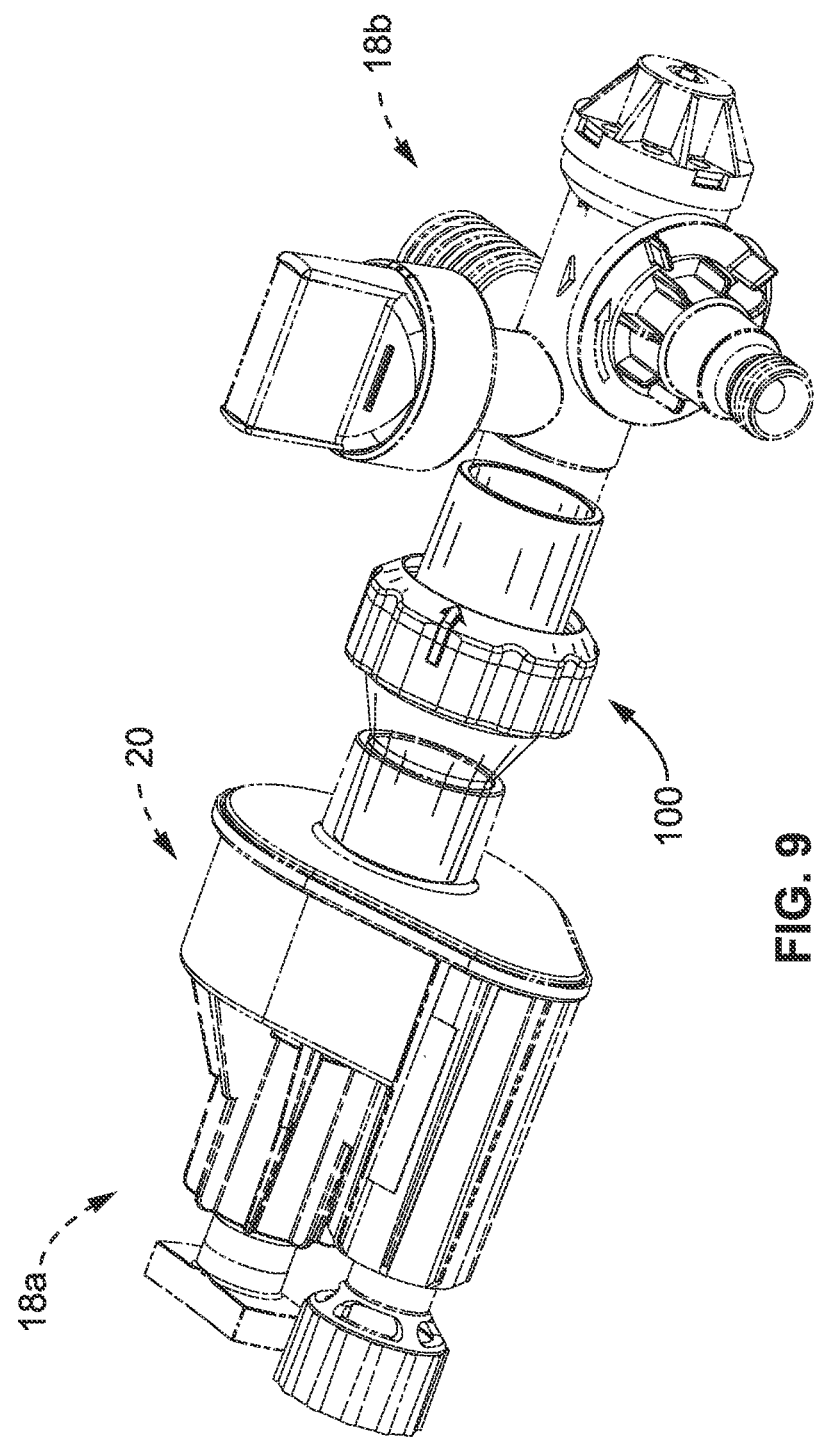
FIG. 9 is a perspective view of the aforementioned adjustable PEEP-valve after insertion inline with the ventilator.

FIG. 8 illustrates an embodiment of an adjustable PEEP-valve apparatus 100 according the present disclosure. Similar to the fixed PEEP-valve apparatus 10 previously described herein, the adjustable PEEP-valve 100 includes a valve body 102 with an inlet port 104 and an outlet port 106. Referring also to FIG. 9, the inlet and outlet ports are configured to mate with a ventilator 18a, 18b and be positioned in the exhalation path of the ventilator ahead of the exhalation valve 20 in the manner as previously described. The ventilator depicted in FIG. 8 and FIG. 9 is a VORTRAN® GO2VENT® model 6123 ventilator. It will be appreciated, however, that the PEEP-valve as described herein can be used with other ventilator makes and models.

Figure 10:
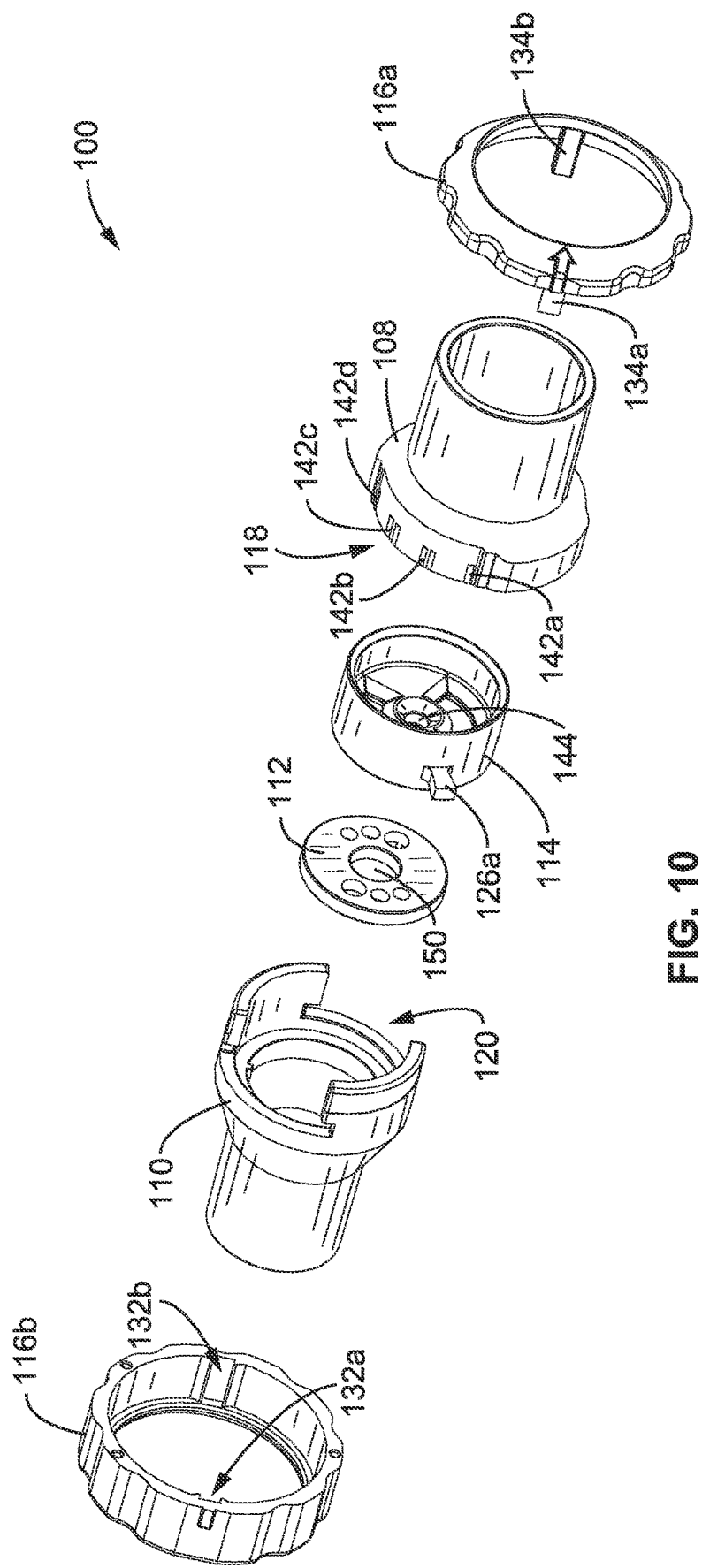
FIG. 10 is an exploded view of the aforementioned adjustable PEEP-valve.

FIG. 10 is an exploded view that illustrates the components of the adjustable PEEP-valve apparatus 100. In the embodiment shown, the apparatus comprises an inlet housing 108, an outlet housing 110, a fixed disk 112, a rotatable disk 114, and an adjustment knob comprising first and second knob sections 116a, 116b, respectively. In one embodiment, the inlet and outlet housings each have cylindrical-shaped internal chambers 118, 120 configured to receive and house the rotatable and fixed disks, respectively. In one embodiment, the outside diameter of the rotatable disk and the outside diameter of the fixed disk are slightly smaller than the inside diameter of their respective housing.

Figure 11:
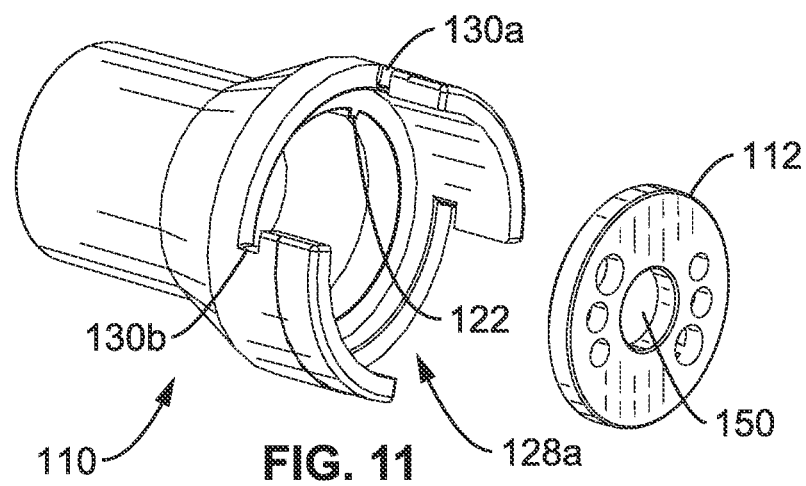
FIG. 11 is a front perspective exploded view of the outlet housing and fixed disk (gate) portion of the aforementioned adjustable PEEP-valve.
Figure 12:
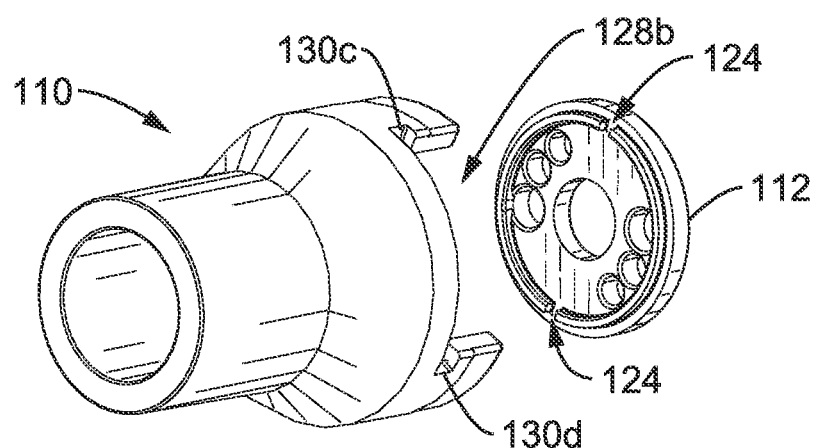
FIG. 12 is a rear perspective exploded view of the outlet housing and fixed disk (gate) portion of the aforementioned adjustable PEEP-valve.

The fixed disk 112 is held in a fixed (non-rotatable) position inside the chamber 120 of the outlet housing 110. Referring also to FIG. 11 and FIG. 12, the outlet housing 110 includes at least one tab 122 that mates with a corresponding slot 124 in the fixed disk. This mating arrangement holds the fixed disk in place and prevents rotation of the fixed disk in relation to the outlet housing.

The rotatable disk 114 fits within both the chamber 118 of the inlet housing 108 and the chamber 120 of the outlet housing 110, and is rotatable in relation thereto. The rotatable disk has a pair of arms 126a, 126b for imparting rotatable motion to the disk. The outlet housing 110 includes first and second cutout areas 128a, 128b, respectively, with notches 130a through 130d. The cutout areas and notches are configured to form a pair of slots through which the arms can rotate when the inlet housing and the outlet housing are assembled. The notches function as stops to limit the rotational travel for the arms. When the two housings are coupled together, only the two arms of the rotatable disk will extend out of the assembly.

Figure 13:
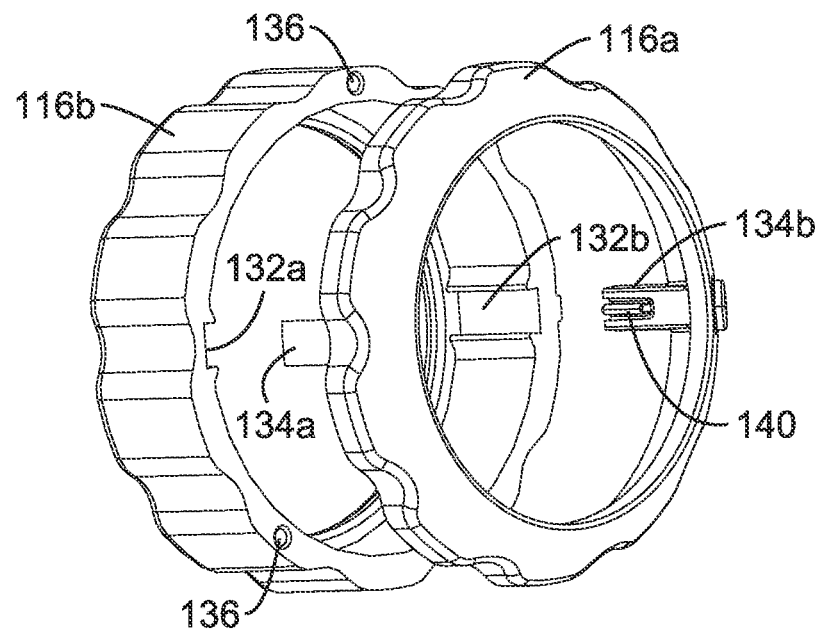
FIG. 13 is a front perspective exploded view of the adjustment knob portion of the aforementioned adjustable PEEP-valve.

Referring again to FIG. 10 as well as to FIG. 13 and FIG. 14, the adjustment knob is a two-part assembly of the first and second knob sections 116a, 116b. The second knob section 116b includes first and second slots 132a, 132b, respectively, that are configured to receive and engage the arms 126a, 126b of the rotatable disk 114. This allows rotation of the adjustment knob to impart rotational motion to the arms. The first knob section 116a includes first and second tabs 134a, 134b that also fit into the first and second slots 132a, 132b, respectively, and allow for mating the first and knob sections 116a, 116b. The second knob section 116b includes one or more holes 136 that receive corresponding pins 138 in first knob section 116a for joining the two sections by, for example, snap fit type engagement.

In addition to facilitating rotation of the rotatable disk to adjust the PEEP level, the rotatable adjustment knob provides the function of snapping and locking the rotatable disk to a desired PEEP level. This is facilitated by a flexible key 140 with a bar-shaped outwardly extending protrusion that is configured to engage locking stops 142a through 142d on the inlet housing 108. In the embodiment shown, each locking stop comprises a pair of parallel spaced-apart bar-shaped outwardly extending protrusions. Other configurations of locking stops, such as detents, could be used as well. As the adjustment knob travels from one position to the next, the flexible key 140 of the adjustment knob glides over the surface of the inlet housing 108 and, at a location of the exterior protrusions, the bar-shaped protrusion in the flexible key 140 registers in a locked position between the parallel bar shaped protrusions of a locking stop. Four positions are illustrated as an example of possible settings. However, it will be appreciated that the apparatus could be configured with fewer or more than four positions.

FIG. 15 through FIG. 18 present front views of an assembly of the rotating disk 114 with the fixed disk positioned behind the rotating disk. In the embodiment shown, the rotatable disk 114 includes a central orifice 144 that is always open and a pair of control ports 146a, 146b that can be rotated between, for example, a fully closed position (FIG. 15), a fully open position (FIG. 18), and two intermediate positions (FIG. 16 and FIG. 17), in relation to the orifices in the fixed disk 112. The control ports extend through the surface of the rotatable disk and are bordered by solid walls 148a, 148b. The fixed disk 112 has a central orifice (port) 150 that is always open and a plurality of radially spaced orifices (ports) 152a through 152f that can selectively be opened or closed as described herein. The central orifices 144 and 150 are aligned and in flow communication so that, regardless of the position of the rotatable disk, exhalation gases will flow through the apparatus. The diameter of the central orifices 144 and 150 is selected based on the maximum PEEP that is desired, and the diameter can be chosen as described above with regard to the fixed PEEP-valve 10.

Figure 18:
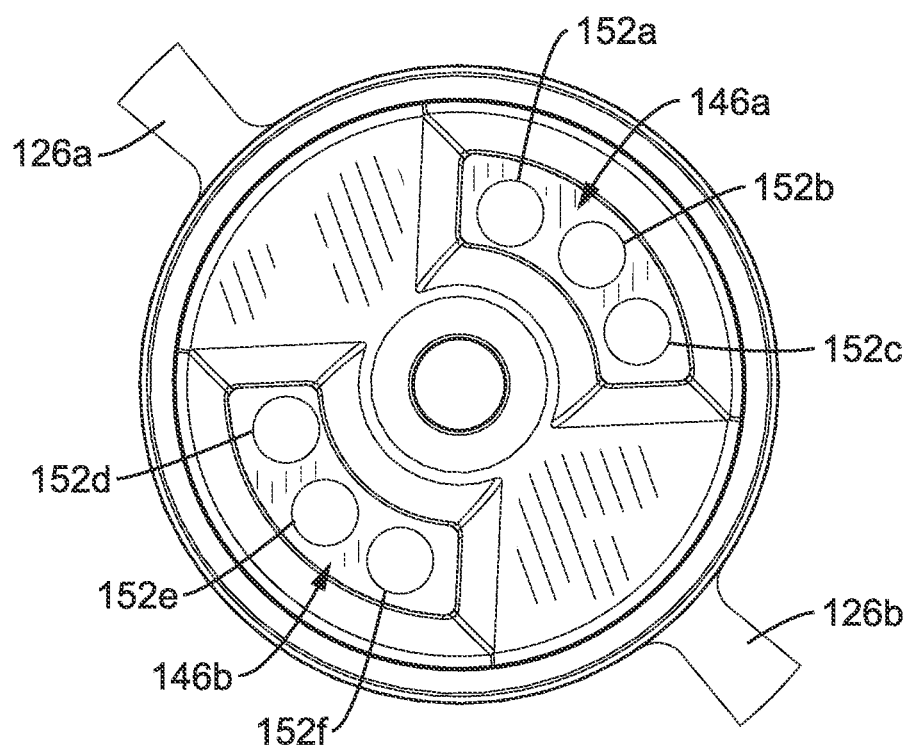

By way of example, and not of limitation, in one embodiment the highest PEEP setting could be about 50% to about 55% (FIG. 15), the next lower setting could be about 40% (FIG. 16), the next lower setting could be about 30% (FIG. 17), and the lowest setting could be about 20% (FIG. 18). Accordingly, this this embodiment the Adjustable PEEP Valve will have 4 positions. Again, by way of example, and not of limitation, the foregoing four settings could be implemented with central orifices having diameters of about 0.15 inches and the following pattern of radial orifices: (i) a pair of about 0.065 inch diameter orifices for the about 40% setting, (ii) a pair of about 0.085 inch diameter orifices for the about 30% setting, and (iii) a pair of about 0.160 inch diameter orifices for the about 20% setting. Overall, a practical range of low to high PEEP preferably would be from about 10% to about 90% or higher, and more preferably from about 20% to about 55%. It will be appreciated, however, that the apparatus is not limited to that range, and that the low, high and intermediate levels can be set to any desired ratios or percentages with orifice diameters chosen accordingly.

In one embodiment, the rotatable disk is configured to rotate freely about its central axis over a span of about 90 degrees. A full 90 degree clockwise rotation places the control ports in the rotatable disk in a full open position in relation to the orifices in the fixed disk to create the lowest flow resistance condition or the lowest PEEP. In the full open position the control ports in the rotatable disk are aligned with one or more of the orifices in the fixed disk. Similarly, a full 90 degree counterclockwise rotation places the rotatable disk in a fully closed position to create the highest flow resistance condition or the highest PEEP. In the fully closed position the radial orifices in the fixed disk are blocked by the solid walls in the rotatable disk. This position represents the highest PEEP value which is set by the diameter of the central orifices 144, 150 because they provide the only flow path in this position. It will also be appreciated that the range of rotation can vary and is not limited to 90 degrees.

In one embodiment, the radial orifices in the fixed disk preferably comprise two sets of orifices wherein each set comprises three orifices as illustrated. In other embodiments, each set can comprise one or more orifices. It will also be appreciated that the radial orifices in the fixed disk can have other shapes as illustrated in FIG. 19. Similarly, the control ports in the rotatable disk preferably comprise a pair of single ports but other port configurations can be used. It will be appreciated that the sizes of the central orifices, the radial orifices, and the control ports can vary by design.

Figure 16:
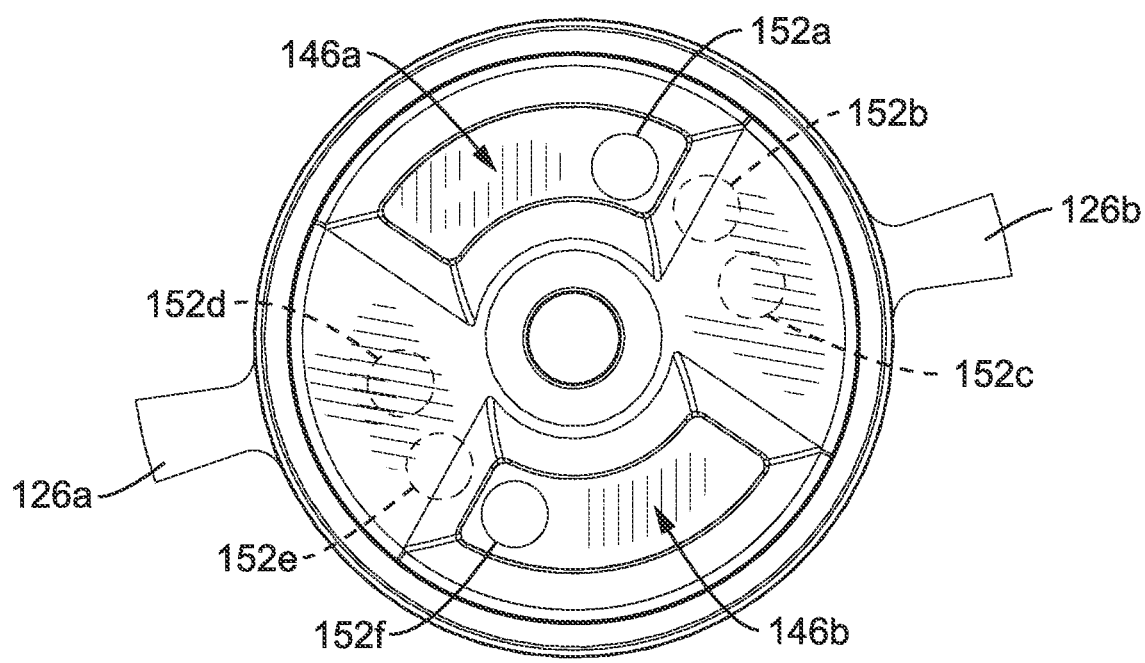
Figure 17:
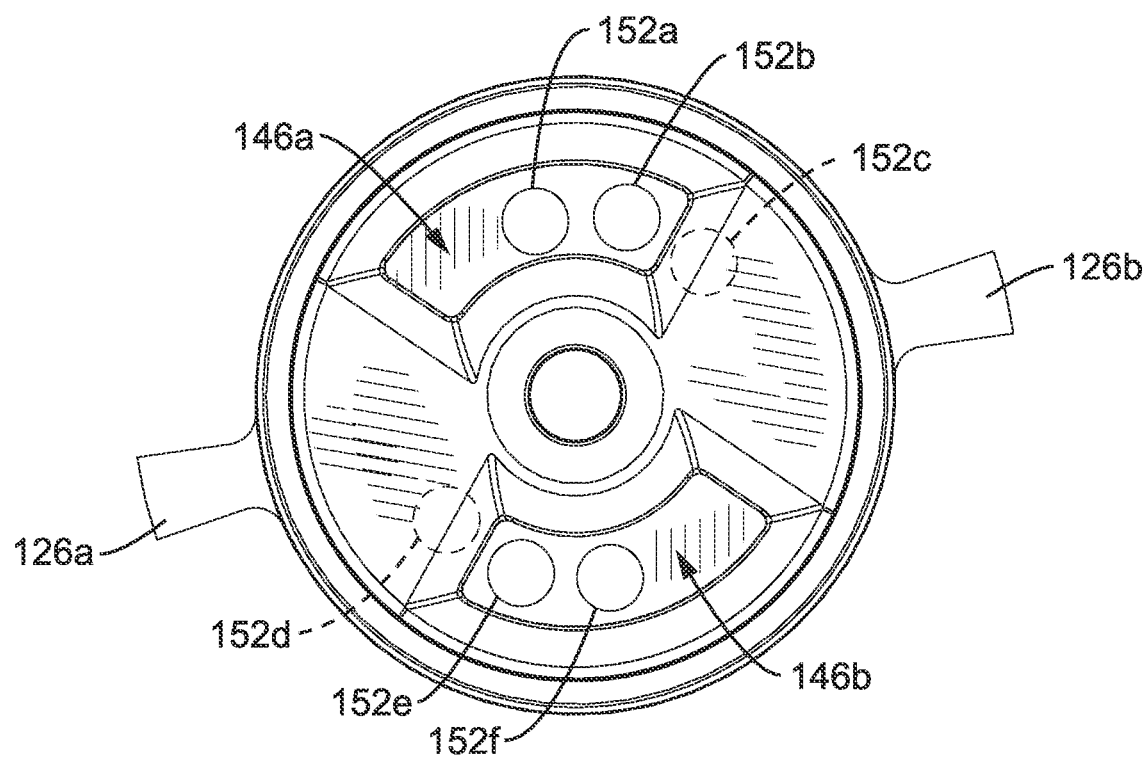

It will further be appreciated that, in one embodiment, the positional relationship between the fixed disk, the rotatable disk, and the locking positions of the adjustment knob can be configured such that the radial orifices in the fixed disk can be opened a pair at a time when the rotatable disk rotates between the open and the closed position, such as orifices 152a, 152f illustrated as illustrated in FIG. 16. However, other configurations can be employed based on the granularity of control desired. For example, the radial orifices in the fixed disk can be positioned such that only one orifice in the fixed disk is open at the medium PEEP setting, or that more than two orifices are open. Furthermore, the diameters of the radial orifices in the fixed disk can be selected for incremental flow resistance, such as from a pair of small size, then medium sizes, and then to a large size. Other combinations could be configured as well. Accordingly, orifice size, number of orifices, and number of orifices open at a particular rotational setting can vary according to application. Again, note that the highest PEEP occurs when all of the radial orifices in the fixed disk are closed off by the rotatable disk and the flow path is only through the central orifices in the fixed and rotatable disks.

Preferably the rotatable and fixed disks have mating surfaces that provide for tight surface engagement. The goal is to have no spacing between the disks so as to prevent radial flow between the surfaces of the disks. Also, the outer diameter of the rotatable disk is preferably close to the inner diameter of the inlet and outlet housings to prevent flow around the edges of the disk but not impede rotation. Conventional seals may be used as appropriate to prevent flow through mating surfaces of the housings and provide sealed chambers.

FIG. 19 is an exploded view of an alternative embodiment 200 of the adjustable PEEP-valve that is configured the same as the previously described embodiment 100 except for the fixed disk. This embodiment includes a fixed disk 202 that has ports 204a, 204b with a similar size and shape as the control ports 146a, 146b in the rotatable disk. FIG. 20 shows an example of the disk positions of the adjustable PEEP-valve when the valve is in its highest PEEP condition (orifice fully closed). FIG. 21 shows an example of the disk positions when the adjustable PEEP-valve is in its lowest PEEP condition (orifice fully open).

Aspects of the adjustable PEEP-valve described herein include, but are not limited to, the following.
 (a) The adjustable orifice opening size makes the device suitable for patient groups of different body size and tidal volume.
 (b) The adjustable effective orifice variation can range from about 100 to about 500 thousands of inches in diameter.
 (c) The adjustable port sizes can range from about 100 to 500 thousands of inches in diameter by turning the adjustment knob.
 (d) Each adjusted orifice port will be effective and suitable for a range of patients.
 (e) Each orifice size can be selected by a rotatable knob, and sizes that are definable and suitable for each particular patient group can be marked on the bod of the chamber.
 (f) The fixed orifice/opening can be closed to minimum opening by rotating the rotatable disk with an external control knob.
 (g) The device can be packaged with both 22 mm and 15 mm ports for use with various mechanical ventilator/resuscitators.
 (h) The components fit together with appropriate seals so that the interior chambers are sealed.

From the description herein, it will be appreciated that the present disclosure encompasses multiple implementations of the technology which include, but are not limited to, the following:

An inline resistance valve configured for placement before an exhalation valve in a ventilator and inline with exhalation flow and which increases Positive End-Expiratory Pressure (PEEP) level provided to a patient by the ventilator.

A ventilation apparatus comprising (a) a ventilator having an exhalation valve and (b) the inline resistance valve of any preceding or following implementation positioned before the exhalation valve and in line with exhalation flow.

A method of increasing Positive End-Expiratory Pressure (PEEP) levels in a ventilator having a exhalation valve comprising placing a resistance valve before the exhalation valve and in line with exhalation flow.

A Positive End-Expiratory Pressure (PEEP) valve apparatus, comprising: (a) a valve body, said valve body having an inlet port and an outlet port, the valve body comprising an inlet housing and an outlet housing; and (b) an orifice in the valve body that is in fluidic communication with the inlet port and the outlet port; (c) wherein the orifice restricts fluid flow between the inlet port and the outlet port; and (d) wherein the inlet port and the outlet port are configured for connection to ventilator inline with an exhaust path and upstream of an exhaust valve in the ventilator.

An adjustable Positive End-Expiratory Pressure (PEEP) valve apparatus, comprising: (a) a valve body, said valve body having an inlet port and an outlet port, the valve body comprising an inlet housing and an outlet housing; (b) a fixed disk retained in the outlet housing; (c) said fixed disk having a central orifice and a radial orifice; (d) a rotatable disk retained in the valve body; (e) the rotatable disk having a central orifice and a control port; (f) wherein the central orifice in the fixed disk is aligned and in fluidic communication with the central orifice in the rotatable disk; (g) wherein the central orifice in the fixed disk and the central orifice in the rotatable disk each have a diameter sufficient to restrict fluid flow between the inlet port and the outlet port; (h) wherein the rotatable disk is rotatable between a first position wherein the radial orifice is blocked by the rotatable disk and a second position wherein the radial orifice and the control port are in fluidic communication; (i) wherein fluidic communication between the radial orifice and the control port increases fluid flow between the inlet port and the outlet port; and (j) wherein a maximum resistance to fluid flow is established when the rotatable disk is in the first position.

An adjustable Positive End-Expiratory Pressure (PEEP) valve apparatus, comprising: (a) a valve body, said valve body having an inlet port and an outlet port, the valve body comprising an inlet housing and an outlet housing; (b) a fixed disk retained in the outlet housing; (c) said fixed disk having a central orifice and a radial orifice; (d) a rotatable disk retained in the valve body; (e) the rotatable disk having a central orifice and a control port; (f) wherein the central orifice in the fixed disk is aligned and in fluidic communication with the central orifice in the rotatable disk; (g) wherein the central orifice in the fixed disk and the central orifice in the rotatable disk each have a diameter sufficient to restrict fluid flow between the inlet port and the outlet port; (h) wherein the rotatable disk is rotatable between a first position wherein the radial orifice is blocked by the rotatable disk and a second position wherein the radial orifice and the control port are in fluidic communication; (i) wherein fluidic communication between the radial orifice and the control port increases fluid flow between the inlet port and the outlet port; (j) wherein a maximum resistance to fluid flow is established when the rotatable disk is in the first position; (k) wherein the inlet port and the outlet port are configured for connection to ventilator inline with an exhaust path and upstream of an exhaust valve in the ventilator; (l) wherein maximum resistance to fluid flow establishes a maximum PEEP level provided to a patient by the ventilator; and (m) wherein rotation of the rotatable disk from the first position to the second position decreases PEEP level.

The apparatus of any preceding implementation, further comprising: an adjustment knob that is rotatable about the valve body; and wherein the adjustment knob and the rotatable disk are coupled whereby rotation of the adjustment knob rotates the rotatable disk.

The apparatus of any preceding implementation, further comprising: a flexible key positioned interiorly to the adjustment knob; and a plurality of spaced-apart lock stops positioned on the valve body; wherein rotation of the adjustment knob is impeded when the flexible key engages a lock stop.

An adjustable Positive End-Expiratory Pressure (PEEP) valve apparatus, comprising: (a) a valve body, said valve body having an inlet port and an outlet port, the valve body comprising an inlet housing and an outlet housing; (b) a fixed disk retained in the outlet housing; (c) said fixed disk having a central orifice and a radial orifice; (d) a rotatable disk retained in the valve body; (e) the rotatable disk having a central orifice and a control port; (f) wherein the central orifice in the fixed disk is aligned and in fluidic communication with the central orifice in the rotatable disk; (g) wherein the central orifice in the fixed disk and the central orifice in the rotatable disk each have a diameter sufficient to restrict fluid flow between the inlet port and the outlet port; (h) wherein the rotatable disk is rotatable between a first position wherein the radial orifice is blocked by the rotatable disk and a second position wherein the radial orifice and the control port are in fluidic communication; (i) wherein fluidic communication between the radial orifice and the control port increases fluid flow between the inlet port and the outlet port; (j) wherein a maximum resistance to fluid flow is established when the rotatable disk is in the first position; (k) an adjustment knob that is rotatable about the valve body; (l) wherein the adjustment knob and the rotatable disk are coupled whereby rotation of the adjustment knob rotates the rotatable disk; (m) a flexible key positioned interiorly to the adjustment knob; and (n) a plurality of spaced-apart lock stops positioned on the valve body; (o) wherein rotation of the adjustment knob is impeded when the flexible key engages a lock stop.

The apparatus of any preceding implementation, wherein the inlet port and the outlet port are configured for connection to ventilator inline with an exhaust path and upstream of an exhaust valve in the ventilator.

The apparatus of any preceding implementation, wherein maximum resistance to fluid flow establishes a maximum PEEP level provided to a patient by the ventilator.

The apparatus of any preceding implementation, wherein rotation of the rotatable disk from the first position to the second position decreases PEEP level.

The apparatus of any preceding implementation, wherein in the first position the apparatus provides a high-PEEP level, and wherein in the second position the apparatus provides a low-PEEP level.

The apparatus of any preceding implementation: wherein the rotatable disk has a third position intermediate the first position and the second position; and wherein in the third position the apparatus provides a PEEP level between the high-PEEP level and the low-PEEP level.

The apparatus of any preceding implementation, wherein the fixed disk comprises a plurality of orifices and wherein the rotatable disk comprises a plurality of control ports.

The apparatus of any preceding implementation, wherein the fixed disk comprises two sets of radial orifices and wherein the rotatable disk comprises a pair of control ports separated by solid walls.

The apparatus of any preceding implementation, wherein one or more orifices are sized to increase PEEP level provided to a patient by the ventilator.

The apparatus of any preceding implementation, wherein one or more orifices have a diameter and wherein decreasing orifice diameter increases PEEP level provided to a patient by the ventilator.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

PEEP and Tidal Volume for Various PIP Values with Lung Compliance of 0.01 L/cm-H2O

| | RR ± 2 BPM | | | | | | | | | |
|---|---|---|---|---|---|---|---|---|---|---|
| | 10 | | 15 | | 20 | | 25 | | 30 | |
| Set PIP | PEEP | TV | PEEP | TV | PEEP | TV | PEEP | TV | PEEP | TV |
| 20 | 6 | 132 | 6 | 127 | 7 | 121 | 7 | 114 | 9 | 103 |
| 25 | 7 | 171 | 8 | 162 | 9 | 151 | 10 | 144 | 11 | 130 |
| 30 | 8 | 211 | 9 | 196 | 11 | 182 | 12 | 181 | 14 | 158 |
| 35 | 10 | 243 | 11 | 233 | 13 | 209 | 14 | 210 | 17 | 174 |

TABLE 2

PEEP and Tidal Volume for Various PIP Values with Lung Compliance of 0.05 L/cm-H2O

| | RR ± 2 BPM | | | | | | | | | |
|---|---|---|---|---|---|---|---|---|---|---|
| | 10 | | 15 | | 20 | | 25 | | 30 | |
| Set PIP | PEEP | TV | PEEP | TV | PEEP | TV | PEEP | TV | PEEP | TV |
| 20 | 11 | 477 | 13 | 368 | 15 | 278 | 16 | 227 | 17 | 153 |
| 25 | 15 | 568 | 17 | 403 | 19 | 288 | 20 | 235 | 22 | 166 |
| 30 | 18 | 651 | 21 | 434 | 24 | 296 | 24 | 261 | 26 | 162 |
| 35 | 21 | 699 | 25 | 457 | 27 | 347 | 29 | 266 | 30 | 220 |

What is claimed is:

1. An adjustable Positive End-Expiratory Pressure (PEEP) valve apparatus, comprising:
    (a) a valve body, said valve body having an inlet port and an outlet port, the valve body comprising an inlet housing and an outlet housing;
    (b) a fixed disk retained in the outlet housing;
    (c) said fixed disk having a central orifice and a radial orifice;
    (d) a rotatable disk retained in the valve body;
    (e) the rotatable disk having a central orifice and a control port;
    (f) wherein the central orifice in the fixed disk is aligned and in fluidic communication with the central orifice in the rotatable disk;
    (g) wherein the central orifice in the fixed disk and the central orifice in the rotatable disk each have a diameter sufficient to restrict fluid flow between the inlet port and the outlet port;
    (h) wherein the rotatable disk is rotatable between a first position wherein the radial orifice is blocked by the rotatable disk and a second position wherein the radial orifice and the control port are in fluidic communication;
    (i) wherein fluidic communication between the radial orifice and the control port increases fluid flow between the inlet port and the outlet port; and
    (j) wherein a maximum resistance to fluid flow is established when the rotatable disk is in the first position.

2. The apparatus of claim 1, wherein the inlet port and the outlet port are configured for connection to ventilator inline with an exhaust path and upstream of an exhaust valve in the ventilator.

3. The apparatus of claim 2, wherein maximum resistance to fluid flow establishes a maximum PEEP level provided to a patient by the ventilator.

4. The apparatus of claim 3, wherein rotation of the rotatable disk from the first position to the second position decreases PEEP level.

5. The apparatus of claim 3, wherein in the first position the apparatus provides a high-PEEP level, and wherein in the second position the apparatus provides a low-PEEP level.

6. The apparatus of claim 5:
    wherein the rotatable disk has a third position intermediate the first position and the second position; and
    wherein in the third position the apparatus provides a PEEP level between the high-PEEP level and the low-PEEP level.

7. The apparatus of claim 1, wherein the fixed disk comprises a plurality of orifices and wherein the rotatable disk comprises a plurality of control ports.

8. The apparatus of claim 7, wherein the fixed disk comprises two sets of radial orifices and wherein the rotatable disk comprises a pair of control ports separated by solid walls.

9. The apparatus of claim 1, further comprising:
    an adjustment knob that is rotatable about the valve body; and
    wherein the adjustment knob and the rotatable disk are coupled whereby rotation of the adjustment knob rotates the rotatable disk.

10. The apparatus of claim 9, further comprising:
    a flexible key positioned interiorly to the adjustment knob; and
    a plurality of spaced-apart lock stops positioned on the valve body;
    wherein rotation of the adjustment knob is impeded when the flexible key engages a lock stop.

11. An adjustable Positive End-Expiratory Pressure (PEEP) valve apparatus, comprising:
    (a) a valve body, said valve body having an inlet port and an outlet port, the valve body comprising an inlet housing and an outlet housing;
    (b) a fixed disk retained in the outlet housing;
    (c) said fixed disk having a central orifice and a radial orifice;
    (d) a rotatable disk retained in the valve body;
    (e) the rotatable disk having a central orifice and a control port;
    (f) wherein the central orifice in the fixed disk is aligned and in fluidic communication with the central orifice in the rotatable disk;
    (g) wherein the central orifice in the fixed disk and the central orifice in the rotatable disk each have a diameter sufficient to restrict fluid flow between the inlet port and the outlet port;
    (h) wherein the rotatable disk is rotatable between a first position wherein the radial orifice is blocked by the rotatable disk and a second position wherein the radial orifice and the control port are in fluidic communication;
    (i) wherein fluidic communication between the radial orifice and the control port increases fluid flow between the inlet port and the outlet port;
    (j) wherein a maximum resistance to fluid flow is established when the rotatable disk is in the first position;
    (k) wherein the inlet port and the outlet port are configured for connection to ventilator inline with an exhaust path and upstream of an exhaust valve in the ventilator;
    (l) wherein maximum resistance to fluid flow establishes a maximum PEEP level provided to a patient by the ventilator; and
    (m) wherein rotation of the rotatable disk from the first position to the second position decreases PEEP level.

12. The apparatus of claim 11, wherein in the first position the apparatus provides a high-PEEP level, and wherein in the second position the apparatus provides a low-PEEP level.

13. The apparatus of claim 12:
    wherein the rotatable disk has a third position intermediate the first position and the second position; and
    wherein in the third position the apparatus provides a PEEP level between the high-PEEP level and the low-PEEP level.

14. The apparatus of claim 11, wherein the fixed disk comprises a plurality of orifices and wherein the rotatable disk comprises a plurality of control ports.

15. The apparatus of claim 14, wherein the fixed disk comprises two sets of radial orifices and wherein the rotatable disk comprises a pair of control ports separated by solid walls.

16. The apparatus of claim 11, further comprising:
    an adjustment knob that is rotatable about the valve body; and
    wherein the adjustment knob and the rotatable disk are coupled whereby rotation of the adjustment knob rotates the rotatable disk.

17. The apparatus of claim 16, further comprising:
    a flexible key positioned interiorly to the adjustment knob; and
    a plurality of spaced-apart lock stops positioned on the valve body;
    wherein rotation of the adjustment knob is impeded when the flexible key engages a lock stop.

18. An adjustable Positive End-Expiratory Pressure (PEEP) valve apparatus, comprising:
- (a) a valve body, said valve body having an inlet port and an outlet port, the valve body comprising an inlet housing and an outlet housing;
- (b) a fixed disk retained in the outlet housing;
- (c) said fixed disk having a central orifice and a radial orifice;
- (d) a rotatable disk retained in the valve body;
- (e) the rotatable disk having a central orifice and a control port;
- (f) wherein the central orifice in the fixed disk is aligned and in fluidic communication with the central orifice in the rotatable disk;
- (g) wherein the central orifice in the fixed disk and the central orifice in the rotatable disk each have a diameter sufficient to restrict fluid flow between the inlet port and the outlet port;
- (h) wherein the rotatable disk is rotatable between a first position wherein the radial orifice is blocked by the rotatable disk and a second position wherein the radial orifice and the control port are in fluidic communication;
- (i) wherein fluidic communication between the radial orifice and the control port increases fluid flow between the inlet port and the outlet port;
- (j) wherein a maximum resistance to fluid flow is established when the rotatable disk is in the first position;
- (k) an adjustment knob that is rotatable about the valve body;
- (l) wherein the adjustment knob and the rotatable disk are coupled whereby rotation of the adjustment knob rotates the rotatable disk;
- (m) a flexible key positioned interiorly to the adjustment knob; and
- (n) a plurality of spaced-apart lock stops positioned on the valve body;
- (o) wherein rotation of the adjustment knob is impeded when the flexible key engages a lock stop.

19. The apparatus of claim 18, wherein the inlet port and the outlet port are configured for connection to ventilator inline with an exhaust path and upstream of an exhaust valve in the ventilator.

20. The apparatus of claim 18, wherein maximum resistance to fluid flow establishes a maximum PEEP level provided to a patient by the ventilator.

21. The apparatus of claim 20, wherein rotation of the rotatable disk from the first position to the second position decreases PEEP level.

22. The apparatus of claim 20, wherein in the first position the apparatus provides a high-PEEP level, and wherein in the second position the apparatus provides a low-PEEP level.

23. The apparatus of claim 22:
- wherein the rotatable disk has a third position intermediate the first position and the second position; and
- wherein in the third position the apparatus provides a PEEP level between the high-PEEP level and the low-PEEP level.

24. The apparatus of claim 18, wherein the fixed disk comprises a plurality of orifices and wherein the rotatable disk comprises a plurality of control ports.

25. The apparatus of claim 24, wherein the fixed disk comprises two sets of radial orifices and wherein the rotatable disk comprises a pair of control ports separated by solid walls.

* * * * *